(12) United States Patent
Asim et al.

(10) Patent No.: US 12,634,334 B2
(45) Date of Patent: May 19, 2026

(54) 5G NETWORK FUNCTIONS TO PREVENT CYBER SECURITY THREATS

(71) Applicant: VERIZON PATENT AND LICENSING INC., Basking Ridge, NJ (US)

(72) Inventors: Shahran Asim, Dallas, TX (US); Patrick Dale Balaze, East Meadow, NY (US); Antonio Irvin, Frisco, TX (US); Jason W. Rabon, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 136 days.

(21) Appl. No.: 18/425,492

(22) Filed: Jan. 29, 2024

(65) Prior Publication Data

US 2025/0247417 A1      Jul. 31, 2025

(51) Int. Cl.
| | |
|---|---|
| *H04L 9/40* | (2022.01) |
| *H04L 67/02* | (2022.01) |
| *H04W 12/06* | (2021.01) |

(52) U.S. Cl.
CPC ............ *H04L 63/1441* (2013.01); *H04L 9/40* (2022.05); *H04L 63/1425* (2013.01); *H04L 67/02* (2013.01); *H04W 12/06* (2013.01); *H04L 63/1458* (2013.01); *H04L 63/1466* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 11,431,746 B1 * | 8/2022 | Shaw | ................. | H04L 61/00 |
| 11,622,255 B2 * | 4/2023 | Iddya | ................. | H04W 8/06 |
| | | | | 455/433 |
| 12,316,674 B1 * | 5/2025 | Jiang | ................. | H04L 63/0281 |
| 2002/0198967 A1 * | 12/2002 | Iwanojko | ............ | H04L 41/0873 |
| | | | | 709/220 |
| 2009/0049547 A1 * | 2/2009 | Fan | ................. | H04L 63/1425 |
| | | | | 726/22 |
| 2014/0237564 A1 * | 8/2014 | Dudziak | ............. | H04L 63/08 |
| | | | | 726/6 |
| 2022/0191694 A1 * | 6/2022 | Rajput | ................. | H04W 8/08 |
| 2022/0264307 A1 * | 8/2022 | Sasi | ................. | H04L 63/1458 |
| 2022/0337994 A1 * | 10/2022 | Targali | ................. | H04W 8/12 |
| 2022/0394519 A1 * | 12/2022 | Thangarasa | ........... | H04W 24/08 |

(Continued)

FOREIGN PATENT DOCUMENTS

| | | | | | |
|---|---|---|---|---|---|
| CN | 119031053 A | * | 11/2024 | ............. | H04L 12/66 |
| WO | WO-2024083978 A1 | * | 4/2024 | ............. | H04L 67/56 |

*Primary Examiner* — Lashonda Jacobs-Burton

(57) ABSTRACT

In some implementations, the techniques described herein relate to a method including: receiving a network request from a second network function, the network request including a parameter; validating the parameter upon receipt of the network request to determine a status of the network request, the status indicating a valid or invalid request; processing, by a first network function, a resource managed by the first network function based on the network request and returning a network response when the status indicates a valid request; and denying the network request and returning an error code when the status indicates an invalid request.

20 Claims, 6 Drawing Sheets

(56)  References Cited

U.S. PATENT DOCUMENTS

| | | | |
|---|---|---|---|
| 2023/0199534 A1* | 6/2023 | Rodrigo | H04L 43/10 |
| | | | 370/252 |
| 2023/0283631 A1* | 9/2023 | Bjarnason | H04L 63/1416 |
| 2024/0224098 A1* | 7/2024 | Sun | H04W 48/16 |

* cited by examiner

5G NETWORK FUNCTIONS TO PREVENT CYBER SECURITY THREATS

BACKGROUND

Current 5G network function (NF) infrastructure is based on the HyperText Transfer Protocol Version 2 (HTTP/2) protocol. While HTTP/2 provides a resilient and flexible protocol for NF communications, it is susceptible to being used (intentionally or otherwise) to compromise NFs in a core network.

DETAILED DESCRIPTION

Figure 1:
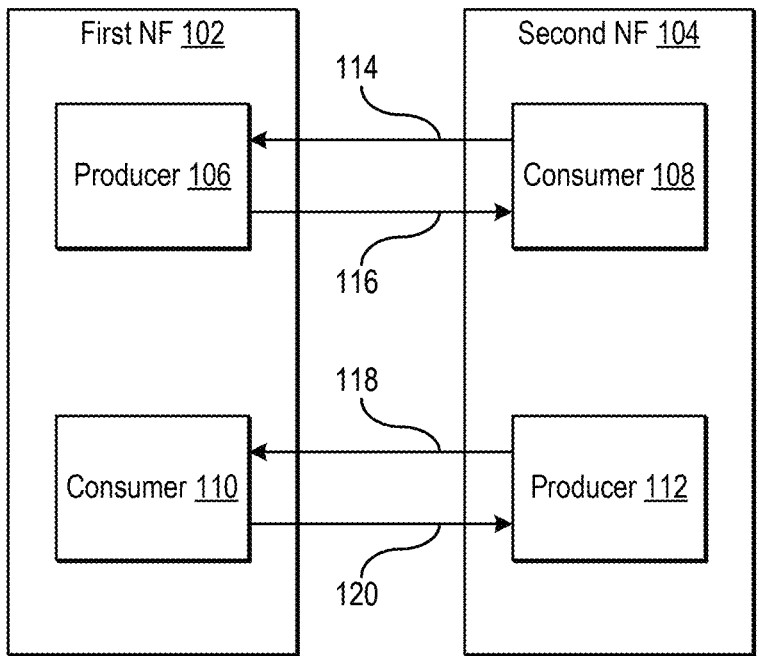
FIG. 1 is a block diagram illustrating an HTTP connection between two NFs in a core network.

In current 5G core network implementations, malicious or negligent actors can manipulate messages by, for example, inserting characters, which can compromise NFs. Further, such insertions can increase the risk of Denial of Service (DoS) attacks directed towards NFs. While transport layer security (TLS) encryption can protect the confidentiality of HTTP/2 messages, such an approach does not protect from source-modified messages which are validly encrypted and sent through a TLS tunnel. Thus, the use of TLS and HTTP/2 in a 5G core network may only provide minimal security, while the entire network is still exposed to other attack vectors.

The disclosed embodiments provide methods, systems, and computer-readable media for preventing such attacks. In a first implementation, the disclosed embodiments provide additional layers of input validation when the messages are being sent and/or received by NFs. This feature prevents malicious data from being processed by a receiving NF and thus prevents attacks such as SQL injection attacks and others. In a second implementation, a centralized application programming interface (API) gateway is provided which filters messages to NFs to ensure that the messages are not malicious (e.g., including SQL injection attacks or cross-site scripting, XSS, attacks). The gateway then either accepts and forwards messages or rejects messages based on its analysis.

The disclosure relates to a method for receiving and handling network requests, particularly emphasizing the role of first and second network functions in this process. These network functions may include a containerized application structure, providing a modular and efficient environment for network operations. The method includes validating parameters included in network requests. This validation process is used to distinguish between valid and invalid requests. It involves security measures such as cross-site scripting detection, SQL injection detection, special character detection, and protection against denial of service (DoS) attacks. This can ensure that the processing of network requests, including those structured as HTTP or HTTP/2 requests, is secure and reliable.

In scenarios where network requests are validated positively, the method includes processing the requests by the first network function, leading to appropriate network responses. Conversely, invalid requests can be denied, with error codes being generated as part of the response mechanism. This dual approach of handling network requests enhances the overall security and efficiency of the cellular core network.

Further, the disclosure describes an implementation where a gateway function is provided to mediate network requests. This gateway receives network requests and conducts preliminary validation. Post-validation, valid requests are forwarded to the first network function for further processing. This gateway function can thus act as an initial checkpoint, augmenting the security framework of the network.

FIG. 1 is a block diagram illustrating an HTTP connection between two NFs in a core network.

The illustrated diagram depicts a first network function 102 and a second network function 104. As illustrated, first network function 102 and second network function 104 may comprise 5G core network functions. First network function 102 may include a first producer process 106 and a first consumer process 110 while second network function 104 may include a second consumer process 108 and a second producer process 112.

NFs within a core network, particularly in the context of 5G, are components that handle various network tasks and services. These functions can be broadly categorized into several types, such as Access and Mobility Management Functions (AMF), Session Management Functions (SMF), and User Plane Functions (UPF), each serving distinct roles in network operations. AMFs, for instance, can be responsible for managing connectivity and access control, while SMFs can handle session establishment and maintenance. UPFs can be involved in data processing and forwarding. In a consumer/producer architecture, these network functions can be designed to operate either as consumers or producers. A consumer NF requests data or services (e.g., using or consuming the data), typically initiating communication, while a producer NF can respond to these requests, providing the necessary data or services (e.g., generating or producing the data). This architecture facilitates efficient and organized data flow within the network, ensuring that each function focuses on specific tasks aligned with its designated role as a consumer or producer. The flexibility of this architecture allows for scalable and adaptable network configurations, critical in handling the dynamic nature of modern telecommunications networks.

In some implementations, the communications between first network function 102 and second network function 104 can be asynchronous, synchronous, or push based. Indeed, in some implementations, no limit is placed on the type of communications. In general, however, the network functions may communicate via a shared protocol such as HTTP or HTTP/2. Although "HTTP" is used herein, reference to HTTP includes both HTTP and HTTP/2.

The use of HTTP and its evolution, HTTP/2, in 5G networks marks a significant departure from previous network protocols predominantly used in earlier cellular networks. Historically, telecommunications networks have relied on custom, often proprietary protocols optimized for specific network functions. However, with the advent of 5G, there is a shift towards more standardized, internet-based protocols, among which HTTP is predominant. This shift is often driven by the need for greater interoperability, flexibility, and scalability in network functions as 5G networks support a vast array of services and devices. HTTP's stateless request-response model can be well-suited for the dynamic and distributed nature of 5G networks, facilitating efficient communication between network functions. This efficiency is further enhanced with HTTP/2, which offers improved performance features such as header compression and multiplexing, allowing multiple requests and responses to be in flight simultaneously over a single connection. These capabilities can make HTTP/2 an ideal choice for the high-speed, low-latency requirements of 5G networks, enabling more responsive and efficient network function interactions compared to the protocols used in previous cellular generations.

The adoption of HTTP/2 within 5G core network implementations has facilitated the integration of REST (Representational State Transfer) architectural principles, which utilize a uniform interface for interacting with resources. In the context of 5G, the uniform interface principle can be applied to ensure a standardized method for accessing and manipulating resources across the network. Each resource, identified uniquely by a URI (Uniform Resource Identifier), can be interfaced with a defined set of operations that align with RESTful services. For example, the HTTP POST operation enables the creation of new resources, while the HTTP GET operation retrieves existing resources, ensuring that each service's state can be queried and observed. The HTTP PUT and PATCH methods allow for the full replacement or partial update of resources, respectively, utilizing, for example, JavaScript Object Notion (JSON) payloads for structured and efficient data interchange. Lastly, the HTTP DELETE operation completes the suite by enabling the removal of resources. This systematic approach to resource management, provided by HTTP/2, can enhance the modularity, scalability, and interoperability of services within 5G networks, aligning with the broader goals of REST to create a more flexible and agile network environment.

In the realm of 5G networks, the concept of a service-based interface (SBI) represents a change in how network elements interact with each other. SBIs define the manner in which NFs expose their capabilities and services. Unlike traditional point-to-point communication, SBIs can allow for a more decoupled and flexible interaction model where network functions are treated as services that can be discovered, accessed, and utilized by other functions within the network. This is exemplified in the HTTP requests and responses (e.g., HTTP request 114 and HTTP response 116), where a network function can issue a request (e.g., HTTP GET for retrieving information, HTTP POST for creating resources) and receive a corresponding response, without the need for a fixed, predefined pathway. This service-oriented approach, facilitated by HTTP/2's efficiency, allows for a more dynamic and scalable network architecture, enabling network elements to operate both as clients and servers within a distributed network ecosystem.

As one example, second consumer process 108 may issue an HTTP request 114 to first producer process 106. In response, first producer process 106 may perform operations based on the request (described later herein) and generate an HTTP response code and body. In response, first producer process 106 may return the HTTP response 116 to the second consumer process 108, completing the transaction. In some implementations, the code may indicate whether the operation was successfully completed or failed. In some implementations, an HTTP status code may represent the status.

Within the service-based architecture of 5G networks, one-off request/response pairs are a common communication pattern, especially between producer and consumer network functions, as exemplified by HTTP request 114 and HTTP response 116. Producers are responsible for generating and providing data or services, while consumers are the requestors of such data or services. A consumer network function may send a single, isolated HTTP request to a producer network function—for instance, an HTTP GET to retrieve specific data or an HTTP POST to command the creation of a new network resource. The producer network function, upon receiving the request, processes it and sends back a corresponding HTTP response. This exchange represents a stateless interaction where each request is self-contained, carrying all necessary information, which allows the producer to understand and fulfill the request without needing prior context.

As a second example, first consumer process 110 may issue an HTTP request to second producer process 112 to subscribe to second network function 104 and receive notifications in response. In some implementations, second producer process 112 may perform operations (also described later herein) to validate the subscription and return an HTTP status as part of an HTTP response 120 indicating whether the subscription was successfully registered (e.g., an HTTP status code of 200 to indicate a success). In some implementations, later notifications may be pushed from second producer process 112 to first consumer process 110 via HTTP messages.

In the context of HTTP and service-based architectures, a subscribe/notify transaction is a communication pattern where a consumer network function expresses interest in receiving updates about a particular resource managed by a producer network function. The subscription is typically initiated by the consumer sending an HTTP POST request, which includes the intent to subscribe, to the producer network function. The producer then acknowledges this subscription by sending back a response, often with an HTTP 200 OK status code if the subscription is successful. Upon the occurrence of a specified event or condition, the producer network function will send a notification to the subscriber, which is usually an HTTP POST or PUSH (e.g., Server Push) message containing the update. This pattern is particularly useful in scenarios where continuous polling by the consumer is inefficient. By subscribing, the consumer is notified immediately of important changes without the need to constantly check for them, thus saving network resources and reducing latency. This subscribe/notify mechanism fits well within the RESTful paradigm and HTTP/2's capabilities, allowing for efficient and real-time communication between network functions in a 5G network.

Figure 2:
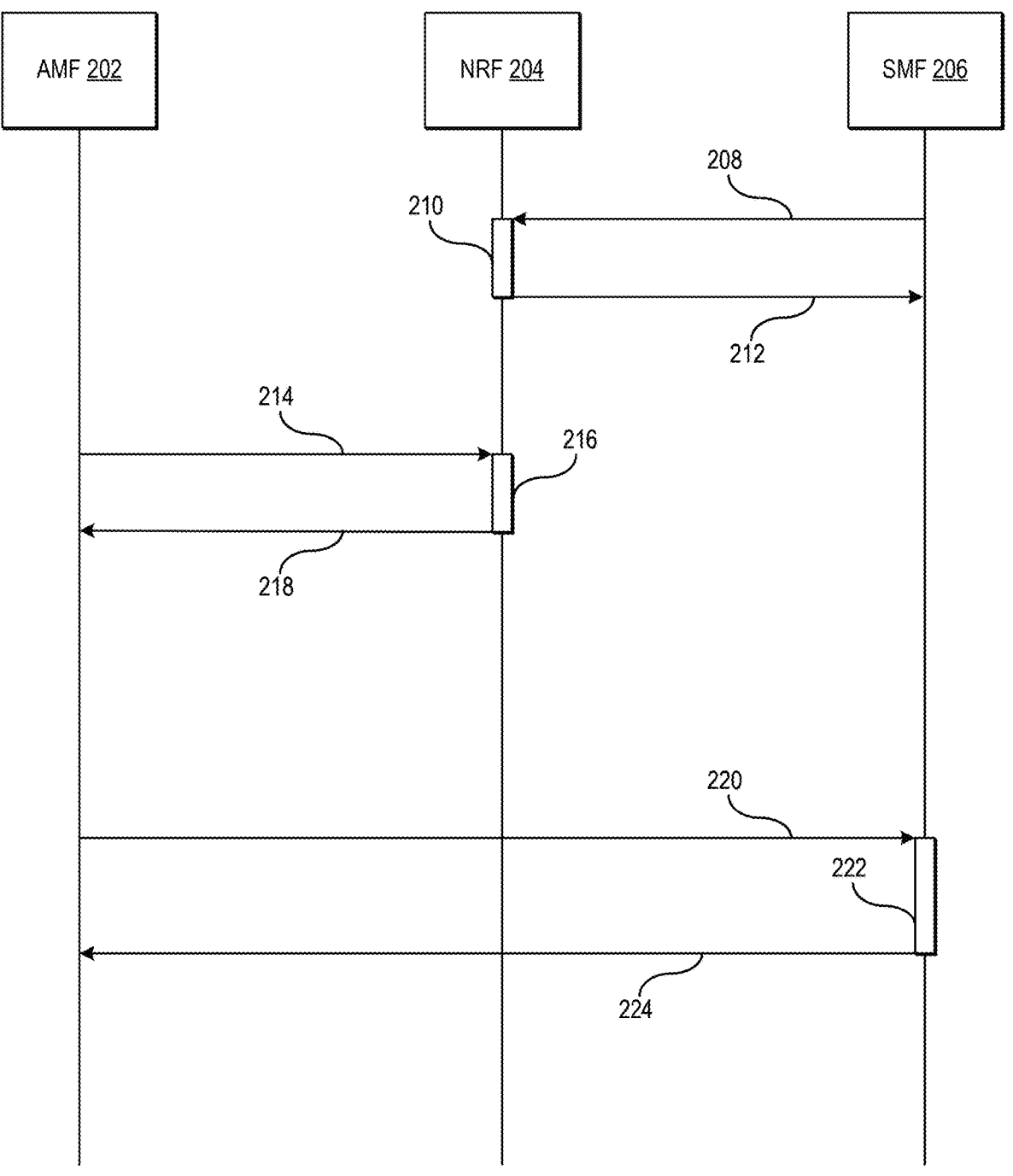
FIG. 2 is a sequence diagram illustrating a process for validating network messages between NFs in a core network.

FIG. 2 is a sequence diagram illustrating a process for validating network messages between NFs in a core network.

The sequence diagram illustrates a series of network requests and responses issued between an AMF 202, Network Repository Function (NRF) 204, and SMF 206. Broadly, the diagram illustrates three sub-processes: a service registration process (request 208, response 212), a service discovery process (request 214, response 218, and a session establishment process (request 220, response 224).

In the illustrated implementation, SMF 206 may issue a request 208 to the NRF 204 to establish the SMF service. In some implementations, this request 208 can comprise an HTTP PUT method to, for example, an Nnrf_NFManagement service. In some implementations, this PUT request can register a new NF instance in the NRF 204 within the same core network. It may also be used to completely replace an existing NF profile. In some implementations, the parameters of such a request may include an instance identifier (e.g., nfInstanceID), a content type of the payload, and an NF profile.

In response, in block 210, NRF 204 may process the received HTTP PUT request. In some implementations, this process can include validating the parameters included in the HTTP PUT request to prevent one or more malicious acts, as described more fully in FIG. 3. Alternatively, or in conjunction with the foregoing, block 210 can include establishing the service with the NRF 204 such that other consumers may start using the service.

After completing processing, or detecting invalid parameters, the NRF 204 returns a response 212. In some implementations, the response 212 can include a status code indicating whether the request was successful or not. For example, if the request 208 was successful, the NRF 204 may return a HTTP 201 (Created) status code indicating the request was successful. In some implementations, the response 212 can also include the NF profile of the service. Alternatively, if the request was denied (for example, due to malicious parameters), the response 212 can include a status code indicating as such. For example, the response 212 can include an HTTP 4XX or 5XX status code indicating a sender or NRF 204 error, respectively.

In some implementations, at a later time a User Equipment (UE) may request access to an SMF to establish a data session. Such a request is mediated by AMF 202 which receives the request from the UE (not illustrated). In response, the AMF 202 can issue a request 214 to NRF 204 to search for an appropriate service. For example, the NRF 204 may provide an Nnrf_NFDiscovery services which can respond to AMF 202 queries for services. In some implementations, the AMF 202 may issue an HTTP POST request including a body parameter that includes the desired search query (e.g., a requested list of SMFs).

Figure 3:
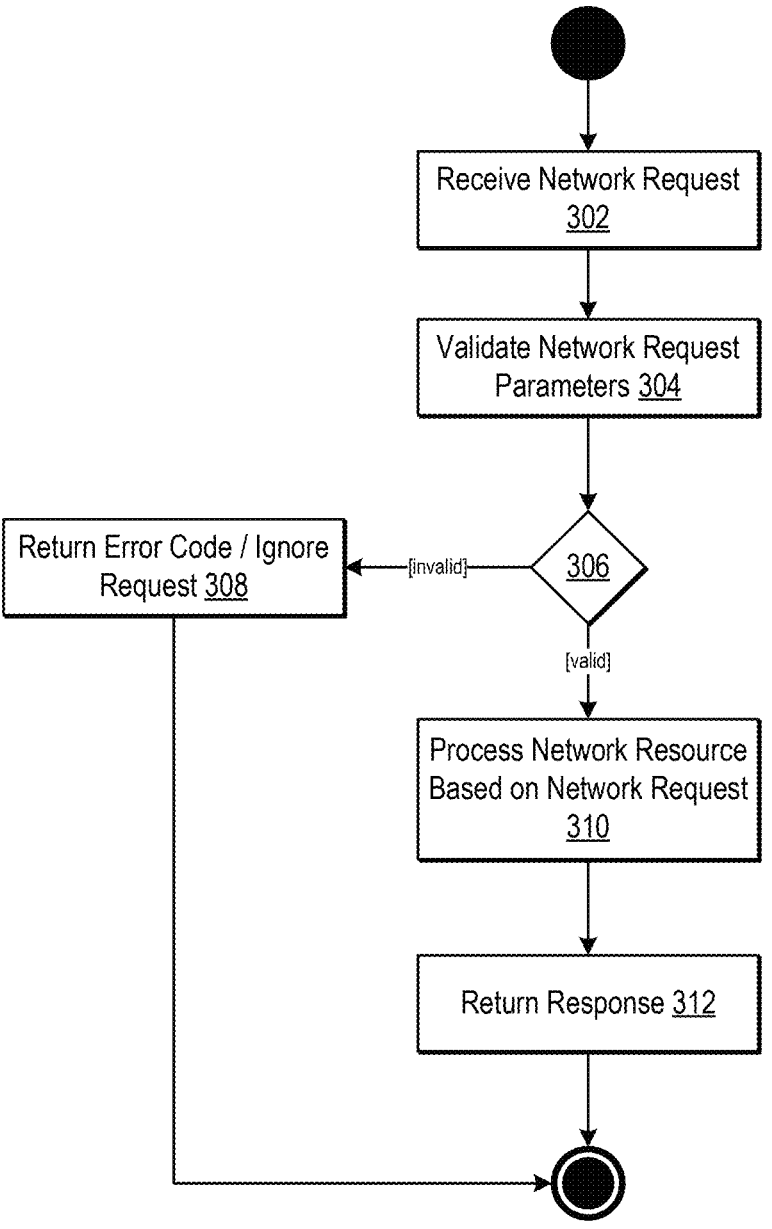
FIG. 3 is a flow diagram illustrating a method for validating network messages between NFs in a core network.

In response, in block 216, this process can include validating the parameters included in the HTTP POST request to prevent one or more malicious acts, as described more fully in FIG. 3. Alternatively, or in conjunction with the foregoing, block 216 can include querying a local database of responsive NFs and generating a response payload including a list of the response NFs (e.g., responsive SMFs).

After completing processing, or detecting invalid parameters, the NRF 204 returns a response 218. In some implementations, the response 218 can include a status code indicating whether the request was successful or not. For example, if the request 214 was successful, the NRF 204 may return a HTTP 200 (OK) status code indicating the request was successful. In some implementations, the response 218 can also include the list of SMFs. Alternatively, if the request was denied (for example, due to malicious parameters), the response 218 can include a status code indicating as such. For example, the response 218 can include an HTTP 4XX or 5XX status code indicating a sender or NRF 204 error, respectively.

Finally, during a session establishment process, the AMF 202 can utilize an SMF in the returned list of SMFs to establish a session over a control plane between the AMF 202 and SMF 206. To implement this, the AMF 202 can issue a request 220 to the SMF 206 (selected from the list provided by the NRF 204). In some implementations, this request can be an HTTP POST request. For example, the SMF 206 can expose a Nsmf_PDUSession services which can handle an HTTP POST request to a CreateSMContext endpoint. In some implementations, this request can include a parameter in the form of an HTTP body parameter including a SMContextCreatedData struct.

In response, in block 222, this process can include validating the parameters included in the HTTP POST request to prevent one or more malicious acts, as described more fully in FIG. 3. Alternatively, or in conjunction with the foregoing, block 222 can include the SMF 206 creating a session management context in the SMF, or in a virtual SMF in roaming scenarios, for a PDU session.

After completing processing, or detecting invalid parameters, the SMF 206 returns a response 224. In some implementations, the response 224 can include a status code indicating whether the request was successful or not. For example, if the request 220 was successful, the SMF 206 may return a HTTP 200 (OK) status code indicating the request was successful. In some implementations, the response 224 can also be used to create a session management context data structure that includes session management information for maintaining and managing the state and attributes of a 5G network session. Alternatively, if the request was denied (for example, due to malicious parameters), the response 224 can include a status code indicating as such. For example, the response 224 can include an HTTP 4XX or 5XX status code indicating a sender or SMF 206 error, respectively.

The sequence of messages between network functions, as orchestrated in FIG. 2, can be vulnerable to various forms of cyberattacks, each exploiting different aspects of the communication protocols. A prevalent threat scenario involves Cross-Site Scripting (XSS) attacks, where malicious scripts are injected into the network messages. In such an attack, the malicious payload is embedded within the messages exchanged, such as in an HTTP PUT request, with the intention that the receiving NF will execute the script. The execution of such scripts can lead to unauthorized actions, data breaches, or the compromise of the NF itself.

Additionally, when NFs interface with a database server, such as a Home Subscriber Server (HSS) or a Unified Data Repository (UDR), they may be susceptible to SQL Injection attacks. This type of attack is characterized by the insertion of malicious SQL queries into an HTTP request. If not adequately sanitized, these queries can be executed by the database, leading to unauthorized data access, corruption, or deletion.

Moreover, the communication protocol is also at risk of Denial of Service (DoS) attacks, particularly through the exploitation of the HTTP POST method. An attacker may flood the NF with a high volume of POST messages, each with varying sequence numbers, overwhelming the system's capacity to respond. This can lead to service disruption, where legitimate requests cannot be processed in a timely manner, if at all. Employing rate limiting, anomaly detection systems, and prioritization of requests by sequence validation are effective strategies to identify and curb such DoS attempts. To address these concerns, the methods of FIGS. 3 and/or 4 may be employed.

FIG. 3 is a flow diagram illustrating a method for validating network messages between NFs in a core network. In some implementations, the method of FIG. 3 can be implemented by any given NF in a 5G core network.

In step 302, the method can include receiving a network request. Step 302 initiates the method with the reception of a network request by another NF within the 5G core network. This request can be transmitted using the HTTP protocol, leveraging its method semantics for action indication. For instance, an HTTP POST request can contain a body that may include structured data formats like JSON or XML, representing the command or data payload intended for the NF. The POST body encapsulates the specifics of the action to be taken or the information to be processed, such as a request to initiate a service or to update a subscriber's session data. Additionally, network requests can also carry query parameters appended to the request URI, providing a means to include additional context or directives for the NF. These parameters are often key-value pairs that can be utilized by the NF to further refine the processing of the request.

In the context of 5G NF function calls, examples of network requests might include an AMF issuing an HTTP POST to an SMF for session management, containing details for a new session establishment. Alternatively, a request might involve an NF fetching subscription data from a UDR using an HTTP GET, where the required subscriber identifiers are passed as query parameters.

In step 304, the method can include validating the parameters of the network request. The method, at 304 can begin by parsing the HTTP request headers, body, and URI query parameters. Headers may contain metadata such as content type, which informs the NF about the format of the data payload, and authentication information, which is crucial for security purposes.

For requests with bodies, such as POST or PUT, the NF can parse the body to extract the data payload. This can involve interpreting the JSON or XML formatted data, which can include the NF utilizing parsers that can convert these structured text formats into internal data structures that the NF's logic can operate upon. For example, if the NF receives a JSON payload, it can use a JSON parser to translate the payload into a format that can be accessed and utilized in subsequent steps of the method. Query parameters present in the URI can also be extracted at this stage. These parameters can be used to pass lightweight data or control options to the NF. The NF can decode these parameters from the URI string, often with key-value pairs being separated by delimiters. In the scope of 5G network functions, such parameters might include nfInstanceID, which uniquely identifies an NF instance, or sessionID, which could be used to reference a specific user session. The NF can take these identifiers and prepares them for validation processes, ensuring that they are in the correct format and contain permissible values before further processing.

As network functions continue to evolve, they can increasingly become targets for a variety of web-based attacks, each with its own mechanisms and impacts. XSS attacks aim to inject malicious scripts into web pages viewed by other users, exploiting the trust a user has for a particular site. SQL Injection attacks manipulate backend databases through unvalidated input vulnerabilities, executing unauthorized commands. DoS attacks and the more targeted Distributed DoS (DDoS) attacks flood servers with traffic to overload systems and inhibit service operations. Other prevalent threats include Man-in-the-Middle (MitM) attacks, where attackers intercept and alter communications between two parties; Cross-Site Request Forgery (CSRF), which tricks a web browser into executing an unwanted action in an application to which a user is logged in; and XML External Entity (XXE) attacks, which target weakly configured XML parsers to execute unauthorized commands or access sensitive data. Additionally, threats such as Directory Traversal aim to access files and directories that are stored outside the web root folder, potentially exposing sensitive data.

In some implementations, step 304 can include blocking XSS attacks by employing a sanitization routine. In some implementations, this process can implement context-aware escaping of user inputs, ensuring that any data received is treated strictly as data, not executable code. Escaping can transform special characters into their respective HTML or URL encoded equivalents, preventing them from being interpreted by the browser as part of a script or HTML element. For instance, characters like '<' and '>' would be encoded to '<' and '>' respectively in HTML contexts. Beyond escaping, step 304 can also employ allowlisting, where only input matching a predefined pattern or set of criteria is accepted. Allowlisting is particularly effective as it ensures that inputs conform to expected formats, such as alphanumeric strings for usernames, discarding any input that contains unexpected characters, which could be part of a script.

In some implementations, step 304 may include measures to prevent SQL injection attacks. This can involve the use of parameterized queries or prepared statements, which can separate SQL logic from data inputs. By utilizing these methods, an NF can ensure that input received is not treated as part of the SQL statement to be executed, thus neutralizing the threat of malicious query execution. Additionally, step 304 may involve deploying strict type checking and validation against input patterns that deviate from the expected norm, rejecting any SQL commands inserted into user inputs. Furthermore, the NF may employ an allowlist of permissible input values for additional security. This can be particularly important where dynamic SQL generation is desired.

In some implementations, step 304 may include protocols to mitigate the risk of DoS attacks. This could involve rate-limiting mechanisms which can restrict the number of requests a user can make within a certain timeframe, thus preventing an overload of the NF from a single source. Furthermore, step 304 may involve analyzing traffic patterns using anomaly detection systems to identify and block sudden surges in request volumes that deviate from normal behavior, indicative of a DoS attempt. Additionally, the NF can utilize prioritization of requests, where critical NF functions are queued and processed preferentially over less critical ones. In conjunction with these measures, step 304 can incorporate robust resource allocation and auto-scaling policies that can dynamically adjust the computational resources in response to legitimate traffic spikes, thereby maintaining service continuity despite high load conditions.

In some implementations, step 304 may encompass a suite of defenses to counteract various web-based threats. To thwart MitM attacks, the NF can enforce the use of secure communication protocols like TLS, ensuring that data in transit is encrypted and authenticated. For combating CSRF, the NF may utilize anti-CSRF tokens, which ensure that state-changing requests originate from the authenticated user, not a third party. To protect against XXE attacks, step 304 can disable XML external entities and DTDs (Document Type Definitions) in all XML parsers used by the NF. Furthermore, to prevent Directory Traversal attacks, the NF can employ strict validation of file paths, allowing access only to authorized directories and files, thereby ensuring that user input does not translate into unauthorized file system access.

Certainly, some of all of these input validation processes can be implemented as part of step 304 and the disclosure is not limited to a specific combination.

In some implementations, the method for integrating a parameter validation process into existing NFs within a 5G core network can be executed, for example, via direct code modification or via service mesh implementations via sidecar proxies.

Using a direct approach, each NF is individually modified at the source code level to incorporate the parameter validation logic of step 304. In some implementations, this may involve integrating specific libraries and routines directly into the NF's codebase, which are responsible for handling validations against web-based attacks such as SQL injection, XSS, and DoS, etc. Alternatively, the parameter validation process may be implemented using a service mesh architecture, such as ISITO®, which utilizes sidecar proxies alongside NFs. In this configuration, a sidecar proxy (e.g., Envoy) is deployed with each NF, acting as an intermediary to handle and validate all incoming and outgoing network traffic. The sidecar proxies can be configured to perform parameter validation, thereby abstracting the security logic away from the NFs' primary functionality. This method offers scalability and ease of management, as security policies and validation rules can be centrally managed and updated within the service mesh, without the need for direct modification of each NF.

In step 306, the method can include determining if any of the parameters are invalid. In some implementations, step 306 may involve an evaluation of the parameters against the established security criteria set forth in step 304. If any parameter fails to meet these criteria, the NF can determine the entire network request to be invalid. This decision is predicated on the principle that the integrity of a network request is only as strong as its weakest link; thus, a single failing parameter can render the request suspect and necessitate its rejection to maintain system security. Conversely, if all parameters pass the stringent validation process, the NF may then classify the network request as valid, allowing the process to advance to the subsequent step. This all-or-nothing approach ensures consistency in the security protocol and upholds the network's defense against potential vulnerabilities or attacks.

In step 308, when it is determined that the request is, the method can include returning an error code and ignoring the network request if at least one parameter is invalid.

In some implementations, step 308 can involve the NF generating an appropriate HTTP error code in response to a validation failure detected in step 306. If the invalid parameter is due to client-side issues, such as input errors or forbidden actions, the NF may return a 4XX series error code, indicating that the fault lies with the requestor. For server-side issues such as configuration errors or unavailable services, a 5XX series error code may be more suitable, signaling that the problem is internal to the server. Alongside these error codes, the NF can also provide a detailed error message or explanation within the response body. This message can be structured to give the requestor insight into the nature of the error, potentially guiding them towards remediation or correction of the request, without exposing sensitive system details that could be leveraged for malicious purposes.

If the request is determined to be valid, step 310 can alternatively include processing a network resource based on the network request if all parameters are valid.

In some implementations, step 310 may involve the NF proceeding with the intended processing of the network request, provided all parameters have passed the validation checks. This processing is contingent on the specific function and role of the NF within the 5G core network. For example, if the NF is an Access and Mobility Management Function (AMF), step 310 might include establishing or updating a user's session, involving tasks like authentication, session setup, or mobility management. Alternatively, if the NF is a Session Management Function (SMF), this step could entail configuring network resources for a specific data flow, such as setting up data paths or allocating network slices for enhanced service quality. The processing in step 310 is tailored to the specific capabilities and responsibilities of the NF, ensuring that each network request is actioned in a manner that upholds the overall functionality and integrity of the 5G network.

In step 312, the method can include returning a response to the network request. In some implementations, step 312 may involve the NF finalizing the process by returning a successful HTTP response to the network request. Upon successful completion of the task specified in the request, the NF typically issues a 2XX series status code, most commonly HTTP 200 (OK), indicating that the request has been successfully processed. Along with the status code, the NF may include a response body containing relevant data or confirmation details pertinent to the request. For instance, in the case of a session establishment request by an AMF, the response body might include session parameters or identifiers essential for the ongoing communication. Alternatively, for a resource configuration request handled by an SMF, the response might encapsulate details of the allocated resources or network paths. This response not only signifies the successful execution of the request but also provides necessary information for the requesting entity to proceed with its subsequent operations within the 5G network.

Figure 4:
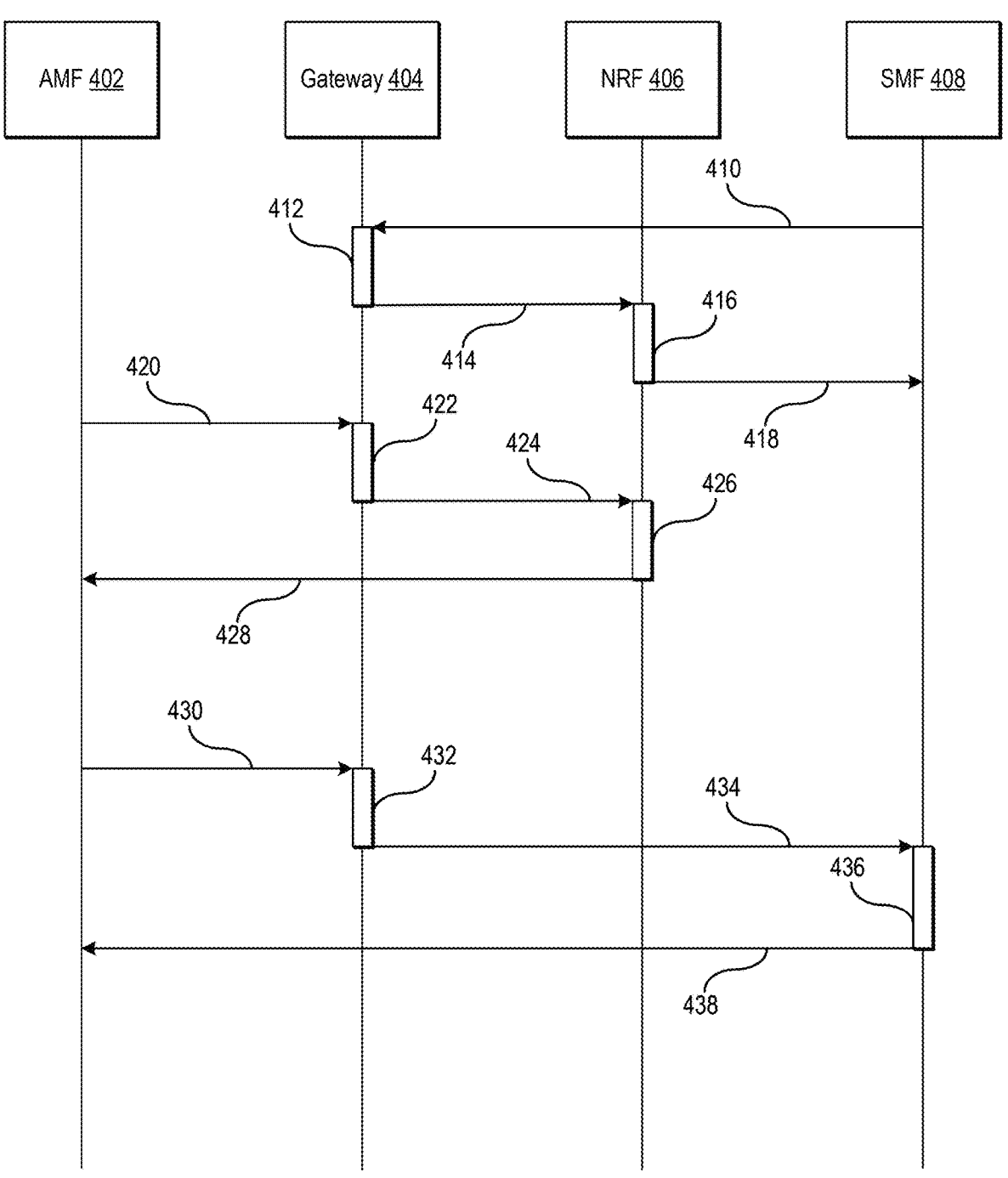
FIG. 4 is a sequence diagram illustrating a process for validating network messages between NFs via a gateway in a core network.

FIG. 4 is a sequence diagram illustrating a process for validating network messages between NFs via a gateway in a core network.

The sequence diagram illustrates a series of network requests and responses issued between an AMF 402, gateway 404, Network Repository Function (NRF) 406, and SMF 408. Broadly, the diagram illustrates three sub-processes: a service registration process (request 410, response 418), a service discovery process (request 420, response 428), and a session establishment process (request 430, response 438).

In the illustrated implementation, SMF 408 may issue a request 410 to the gateway 404 to establish the SMF service. In contrast to the process of FIG. 2, all NF requests in the system of FIG. 4 are mediated by gateway 404. In some implementations, the gateway 404 can expose a single endpoint in which other NFs can request processing of network requests.

In some implementations, this request 410 can comprise an HTTP PUT method to, for example, an Nnrf_NFManagement service (details of which are provided in FIG. 2) which is then marshalled into an HTTP request (e.g., GET request) issued to gateway 404 as a parameter. For example, the entire HTTP PUT request can be converted to a base64-encoded string and then decoded by gateway 404 on receipt.

In response, in block 412, gateway 404 analyze the underlying HTTP PUT request by validating the parameters included in the HTTP PUT request to prevent one or more malicious acts, as described more fully in FIG. 3. In some implementations, gateway 404 can also include first validating the carrier HTTP request (e.g., GET request) to ensure that no malicious parameters exist prior to unmarshalling (e.g., decoding) the received parameters.

After completing processing, or detecting invalid parameters, the gateway 404 can issue the HTTP PUT request to the NRF 406 in request 414. Block 416 can include establishing the service with the NRF 204 such that other consumers may start using the service. In some implementations, the HTTP PUT request can specify a receiver (e.g., SMF 408) of the response. In other implementations, not illustrated, the NRF 406 can return the response to the gateway 404 which can forward the response to the sender (e.g., SMF 408). In this manner, gateway 404 acts as a proxy for all NF calls. In either scenario, the SMF 408 will receive a response similar to that described in FIG. 2. Likewise, in some implementations, the response 418 can include a status code indicating whether the request was successful or not. For example, if the request 410 was successful, the NRF 406 (or gateway 404 if in proxy mode) may return a HTTP 201 (Created) status code indicating the request was successful. In some implementations, the response 418 can also include the NF profile of the service. Alternatively, if the request was denied (for example, due to malicious parameters), the response 418 can include a status code indicating as such. For example, the response 418 can include an HTTP 4XX or 5XX status code indicating a sender or NRF 406 (or gateway 404) error, respectively.

In some implementations, at a later time a UE may request access to an SMF to establish a data session. Such a request is mediated by AMF 402 which receives the request from the UE (not illustrated). In response, the AMF 402 can issue a request 420 to gateway 404 to search for an appropriate service. Similar to the foregoing discussion, the gateway 404 in step 422 can optionally first validate the incoming parameters using the methods described herein and the unmarshall the underlying HTTP request (e.g., an HTTP POST request including a body parameter that includes the desired search query (e.g., a requested list of SMFs)). Next, the gateway 404 can validate the parameters of the unmarshalled HTTP request to prevent one or more malicious acts, as described more fully in FIG. 3. If the parameters are validated, the gateway 404 can forward the HTTP request to the NRF 406 in request 424. In some implementations, block 426 can include querying a local database of responsive NFs and generating a response payload including a list of the response NFs (e.g., responsive SMFs).

After completing processing, the NRF 406 returns a response 428. As discussed, in some implementations, this response 428 can be issued to either the AMF 402 or to the gateway 404 (when operating in proxy mode). In some implementations, the response 428 can include a status code indicating whether the request was successful or not. For example, if the request 420 was successful, the NRF 406 may return a HTTP 200 (OK) status code indicating the request was successful. In some implementations, the response 428 can also include the list of SMFs. Alternatively, if the request was denied (for example, due to malicious parameters), the response 428 can include a status code indicating as such. For example, the response 428 can include an HTTP 4XX or 5XX status code indicating a sender or NRF 204 or gateway 404 error, respectively.

Finally, during a session establishment process, the AMF 402 can utilize an SMF in the returned list of SMFs to establish a session over a control plane between the AMF 402 and SMF 408. To implement this, the AMF 402 can issue a request 430 to the gateway 404, which may include an HTTP POST request to send to the SMF 408 as well as the selected from the list provided by the NRF 204. For example, the SMF 408 can expose a Nsmf_PDUSession services which can handle an HTTP POST request to a CreateSMContext endpoint. In some implementations, this request can include a parameter in the form of an HTTP body parameter including a SMContextCreatedData struct.

Similar to the foregoing discussion, the gateway 404, in block 432, can optionally first validate the incoming parameters using the methods described herein and then unmarshall the underlying HTTP request (e.g., an HTTP POST request including a body parameter that includes the SM context). Next, the gateway 404 can validate the parameters of the unmarshalled HTTP request to prevent one or more malicious acts, as described more fully in FIG. 3. If the parameters are validated, the gateway 404 can forward the HTTP request to the SMF 408 identified in the request 430 in request 434.

In response, block 436 can include the SMF 408 creating a session management context in the SMF, or in a virtual SMF in roaming scenarios, for a PDU session.

After completing processing, or detecting invalid parameters, the SMF 408 returns a response 438. As discussed, in some implementations, this response 438 can be issued to either the AMF 402 or to the gateway 404 (when operating in proxy mode). In some implementations, the response 438 can include a status code indicating whether the request was successful or not. For example, if the request 430 was successful, the SMF 408 may return a HTTP 200 (OK) status code indicating the request was successful. In some implementations, the response 438 can also create session management context data structure that includes session management information for maintaining and managing the state and attributes of a 5G network session. Alternatively, if the request was denied (for example, due to malicious parameters), the response 438 can include a status code indicating as such. For example, the response 438 can include an HTTP 4XX or 5XX status code indicating a sender or SMF 408 error, respectively.

Figure 5:
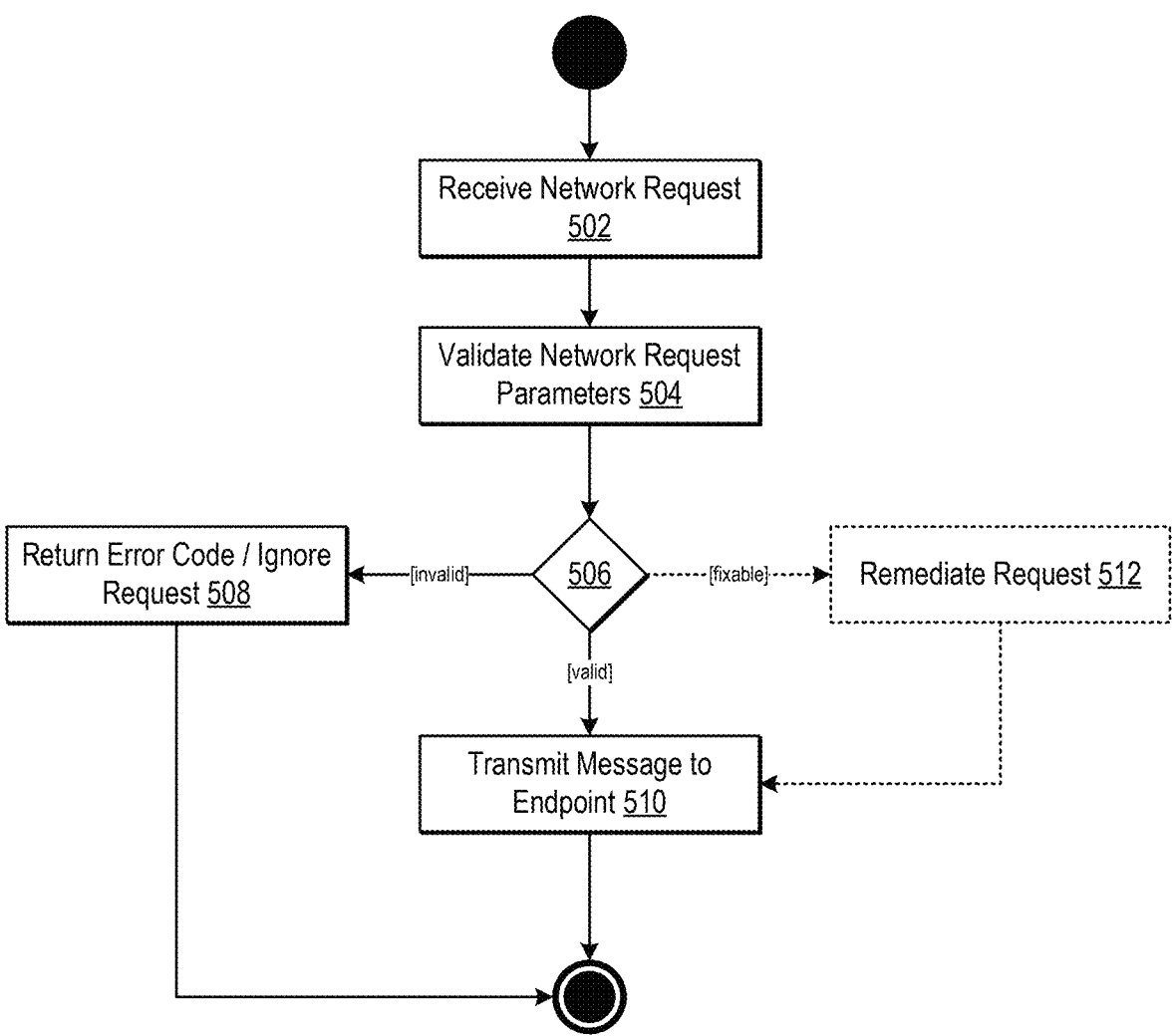
FIG. 5 is a flow diagram illustrating a method for validating network messages between NFs via a gateway in a core network.

FIG. 5 is a flow diagram illustrating a method for validating network messages between NFs via a gateway in a core network.

In step 502, the method can include receiving a network request. In contrast to FIG. 3, in some implementations, the method of FIG. 5 may be performed by a centralized gateway (as described in FIG. 4).

Step 502 initiates the method with the reception of a network request by another NF within the 5G core network. This request can be transmitted using the HTTP protocol, leveraging its method semantics for action indication. For instance, an HTTP POST request can contain a body that may include structured data formats like JSON or XML, representing the command or data payload intended for the NF. The POST body encapsulates the specifics of the action to be taken or the information to be processed, such as a request to initiate a service or to update a subscriber's session data. Additionally, network requests can also carry query parameters appended to the request URI, providing a means to include additional context or directives for the NF. These parameters are often key-value pairs that can be utilized by the NF to further refine the processing of the request.

In the context of 5G NF function calls, examples of network requests might include an AMF issuing an HTTP POST to an SMF for session management via the gateway, containing details for a new session establishment. Alternatively, a request might involve an NF fetching subscription data from a UDR using an HTTP GET via the gateway, where the required subscriber identifiers are passed as query parameters.

In some implementations, the network request can comprise a standardized form (e.g., an HTTP GET request to a fixed endpoint). In some implementations, the parameters of this request can include a marshalled form of the second request to issue to a NF. For example, the sender can convert the desired HTTP request into a base 64-encoded version and transmit this version as a parameter of the network request.

In step 504, the method can include validating the parameters of the network request. The method at 504 can begin by parsing the HTTP request headers, body, and URI query parameters. Headers may contain metadata such as content type, which informs the NF about the format of the data payload, and authentication information, which is crucial for security purposes.

For requests with bodies, such as POST or PUT, the NF can parse the body to extract the data payload. This can involve interpreting the JSON or XML formatted data, which can include the NF utilizing parsers that can convert these structured text formats into internal data structures that the NF's logic can operate upon. For example, if the NF receives a JSON payload, it can use a JSON parser to translate the payload into a format that can be accessed and utilized in subsequent steps of the method. Query parameters present in the URI can also be extracted at this stage. These parameters can be used to pass lightweight data or control options to the NF. The NF can decode these parameters from the URI string, often with key-value pairs being separated by delimiters (e.g., ampersands ('&'), etc.). In the scope of 5G network functions, such parameters might include nfInstanceID, which uniquely identifies an NF instance, or sessionID, which could be used to reference a specific user session. The NF can take these identifiers and prepares them for validation processes, ensuring that they are in the correct format and contain permissible values before further processing.

In some implementations, the method can implement a two-stage validation process as part of step 504. In some implementations, the method can validate the request as received using the methods below. Next, after validating the request as received, the method can unmarshall the request included in a parameter of the request as received and validate that request.

In some implementations, step 504 can include blocking XSS attacks by employing a sanitization routine. In some implementations, this process can implement context-aware escaping of user inputs, ensuring that any data received is treated strictly as data, not executable code. Escaping can transform special characters into their respective HTML or URL encoded equivalents, preventing them from being interpreted by the browser as part of a script or HTML element. For instance, characters like '<' and '>' would be encoded to '<' and '>' respectively in HTML contexts. Beyond escaping, step 504 can also employ allowlisting, where only input matching a predefined pattern or set of criteria is accepted. Allowlisting is particularly effective as it ensures that inputs conform to expected formats, such as alphanumeric strings for usernames, discarding any input that contains unexpected characters, which could be part of a script.

In some implementations, step 504 may include measures to prevent SQL injection attacks. This can involve the use of parameterized queries or prepared statements, which can separate SQL logic from data inputs. By utilizing these methods, an NF can ensure that input received is not treated as part of the SQL statement to be executed, thus neutralizing the threat of malicious query execution. Additionally, step 504 may involve deploying strict type checking and validation against input patterns that deviate from the expected norm, rejecting any SQL commands inserted into user inputs. Furthermore, the NF may employ an allowlist of permissible input values for additional security. This can be particularly important where dynamic SQL generation is desired.

In some implementations, step 504 may include protocols to mitigate the risk of DoS attacks. This could involve rate-limiting mechanisms which can restrict the number of requests a user can make within a certain timeframe, thus preventing an overload of the NF from a single source. Furthermore, step 504 may involve analyzing traffic patterns using anomaly detection systems to identify and block sudden surges in request volumes that deviate from normal behavior, indicative of a DoS attempt. Additionally, the NF can utilize prioritization of requests, where critical NF functions are queued and processed preferentially over less critical ones. In conjunction with these measures, step 504 can incorporate robust resource allocation and auto-scaling policies that can dynamically adjust the computational resources in response to legitimate traffic spikes, thereby maintaining service continuity despite high load conditions.

In some implementations, step 504 may encompass a suite of defenses to counteract various web-based threats. To thwart MitM attacks, the NF can enforce the use of secure communication protocols like TLS, ensuring that data in transit is encrypted and authenticated. For combating CSRF, the NF may utilize anti-CSRF tokens, which ensure that state-changing requests originate from the authenticated user, not a third party. To protect against XXE attacks, step 504 can disable XML external entities and DTDs (Document Type Definitions) in all XML parsers used by the NF. Furthermore, to prevent Directory Traversal attacks, the NF can employ strict validation of file paths, allowing access only to authorized directories and files, thereby ensuring that user input does not translate into unauthorized file system access.

Certainly, some of all of these input validation processes can be implemented as part of step 504 and the disclosure is not limited to a specific combination.

In step 506, the method can include determining if the parameters are valid, invalid or fixable.

In some implementations, step 506 may involve an evaluation of the parameters against the established security criteria set forth in step 504. In some implementations, this step can include analyzing both the parameters of the request as received as well as the ultimate request that will be forwarded to the requested endpoint. If any parameter fails to meet these criteria, the NF can determine the entire network request to be invalid. This decision is predicated on the principle that the integrity of a network request is only as strong as its weakest link; thus, a single failing parameter can render the request suspect and necessitate its rejection to maintain system security. Conversely, if all parameters pass the stringent validation process, the NF may then classify the network request as valid, allowing the process to advance to the subsequent step. This all-or-nothing approach ensures consistency in the security protocol and upholds the network's defense against potential vulnerabilities or attacks.

If the network request is determined to be invalid, in step 508, the method can include returning an error code and ignoring the network request if at least one parameter is invalid.

In some implementations, step 508 can involve the gateway generating an appropriate HTTP error code in response to a validation failure detected in step 506. If the invalid parameter is due to client-side issues, such as input errors or forbidden actions, the gateway may return a 4XX series error code, indicating that the fault lies with the requestor. For server-side issues such as configuration errors or unavailable services, a 5XX series error code may be more suitable, signaling that the problem is internal to the gateway. Alongside these error codes, the gateway can also provide a detailed error message or explanation within the response body. This message can be structured to give the requestor insight into the nature of the error, potentially guiding them towards remediation or correction of the request, without exposing sensitive system details that could be leveraged for malicious purposes.

In step 510, the method can include returning a response to the network request if the parameters are valid.

If the request is determined to be valid, step 510 may include the gateway transmitting the request unmarshalled from the initial request to the desired endpoint. In some implementations, the gateway can inform the endpoint which NF has sent the request, allowing the endpoint NF to transmit its response directly to the consumer NF. In other implementations, the gateway can receive the response from the endpoint NF and return the value to the consumer NF, acting as a proxy for network requests.

As illustrated, in an optional implementation (when the request is determined to be fixable), the method can include remediating a request in step 512 upon determining that the network request is capable of remediation. In some implementations, the method can attempt to remove malicious character strings or other identified vulnerabilities and attempt to issue the network request. For example, as discussed, the method can escape XSS-related character strings and attempt to issue the remediated network request in step 510. Certainly, other types of remediations may be applied to the network request parameters prior to sending the network request to the producer NF.

Figure 6:
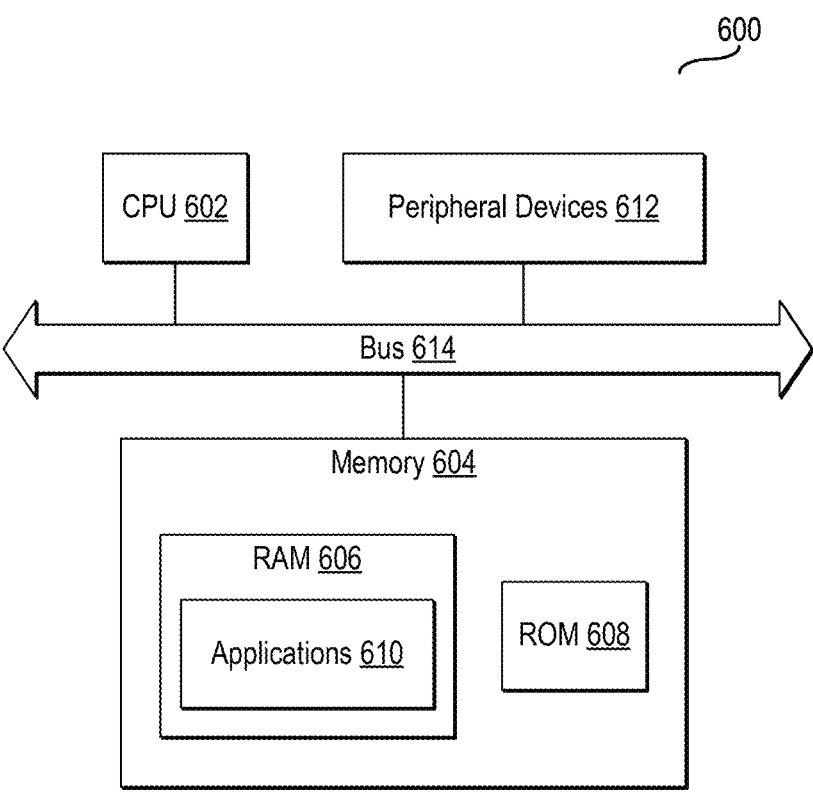
FIG. 6 is a block diagram of a computing device according to some embodiments of the disclosure.

FIG. 6 is a block diagram of a computing device according to some embodiments of the disclosure.

As illustrated, the device 600 includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a memory system including a dynamic random-access memory (DRAM), static random-access memory (SRAM), Flash (e.g., NAND Flash), or combinations thereof. In one embodiment, the bus 614 may comprise a Peripheral Component Interconnect Express (PCIe) bus. In some embodiments, the bus 614 may comprise multiple busses instead of a single bus.

Memory 604 illustrates an example of a non-transitory computer storage media for the storage of information such as computer-readable instructions, data structures, program modules, or other data. Memory 604 can store a basic input/output system (BIOS) in read-only memory (ROM), such as ROM 608 for controlling the low-level operation of the device. The memory can also store an operating system in random-access memory (RAM) for controlling the operation of the device.

Applications 610 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth®, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:
   receiving, by a first network function, a network request from a second network function, the network request including a parameter;
   validating, by the first network function, the parameter upon receipt of the network request to determine a status of the network request, the status indicating a valid or invalid request;
   processing, by the first network function, a resource managed by the first network function based on the network request and returning a network response when the status indicates a valid request; and
   denying the network request and returning, by the first network function, an error code when the status indicates an invalid request.

2. The method of claim 1, wherein the first network function and the second network function each comprise containerized applications executing in a cellular core network.

3. The method of claim 1, wherein the network request comprises a HyperText Transfer Protocol (HTTP) request.

4. The method of claim 3, wherein the HTTP request comprises an HTTP/2 request.

5. The method of claim 1 wherein validating the parameter comprises one or more of performing cross-site scripting detection, structured query language (SQL) injection detection, special character detection, or denial of service (DoS) detection.

6. The method of claim 1, wherein receiving the network request comprises receiving the network request at a gateway function and wherein validating the parameter comprises validating the parameter via the gateway function.

7. The method of claim 6, further comprising forwarding, by the gateway function, the network request to the first network function when the status indicates a valid request.

8. A non-transitory computer-readable storage medium for tangibly storing instructions capable of being executed by a processor, the instructions defining steps of:
   receiving, by a first network function, a network request from a second network function, the network request including a parameter;
   validating, by the first network function, the parameter upon receipt of the network request to determine a status of the network request, the status indicating a valid or invalid request;
   processing, by the first network function, a resource managed by the first network function based on the network request and returning a network response when the status indicates a valid request; and
   denying the network request and returning, by the first network function, an error code when the status indicates an invalid request.

9. The non-transitory computer-readable storage medium of claim 8, wherein the first network function and the second network function each comprise containerized applications executing in a cellular core network.

10. The non-transitory computer-readable storage medium of claim 8, wherein the network request comprises a HyperText Transfer Protocol (HTTP) request.

11. The non-transitory computer-readable storage medium of claim 10, wherein the HTTP request comprises an HTTP/2 request.

12. The non-transitory computer-readable storage medium of claim 8 wherein validating the parameter comprises one or more performing cross-site scripting detection, structured query language (SQL) injection detection, special character detection, or denial of service (DoS) detection.

13. The non-transitory computer-readable storage medium of claim 8, wherein receiving the network request comprises receiving the network request at a gateway function and wherein validating the parameter comprises validating the parameter via the gateway function.

14. The non-transitory computer-readable storage medium of claim 13, further comprising forwarding, by the gateway function, the network request to the first network function when the status indicates a valid request.

15. A device comprising:
a processor configured to:
  receive, by a first network function, a network request from a second network function, the network request including a parameter;
  validate, by the first network function, the parameter upon receipt of the network request to determine a status of the network request, the status indicating a valid or invalid request;
  process, by the first network function, a resource managed by the first network function based on the network request and returning a network response when the status indicates a valid request; and
  deny the network request and return, by the first network function, an error code when the status indicates an invalid request.

16. The device of claim 15, wherein the first network function and the second network function each comprise containerized applications executing in a cellular core network.

17. The device of claim 15, wherein the network request comprises a HyperText Transfer Protocol (HTTP) request.

18. The device of claim 17, wherein the HTTP request comprises an HTTP/2 request.

19. The device of claim 15, wherein validating the parameter comprises one or more performing cross-site scripting detection, structured query language (SQL) injection detection, special character detection, or denial of service (DoS) detection.

20. The device of claim 15, wherein processing a resource managed by the first network function based on the network request and returning a network response when the status indicates a valid request forwarding the network request to the first network function when the status indicates a valid request.

* * * * *